United States Patent [19]

Kemper

[11] Patent Number: 4,572,015
[45] Date of Patent: Feb. 25, 1986

[54] NUTATING TRACTION DRIVE TRANSMISSION

[75] Inventor: Yves J. Kemper, Birmingham, Mich.

[73] Assignee: Caterpillar Tractor Co., Peoria, Ill.

[21] Appl. No.: 596,495

[22] Filed: Apr. 4, 1984

[51] Int. Cl.$^4$ .................... F16H 15/16; F16H 37/06; F16H 1/38
[52] U.S. Cl. ...................................... 74/191; 74/710; 74/690
[58] Field of Search ............... 74/710, 190, 191, 193, 74/190.5, 192, 690

[56] References Cited

U.S. PATENT DOCUMENTS

| | | | |
|---|---|---|---|
| Re. 30,981 | 6/1982 | Kemper | 74/193 |
| 4,233,851 | 11/1980 | Kemper | 74/191 |
| 4,233,859 | 11/1980 | Kemper | 74/690 |
| 4,267,749 | 5/1981 | Chambers et al. | 74/690 |
| 4,277,982 | 7/1981 | Kemper | 74/191 |
| 4,280,369 | 7/1981 | Pouliot | 74/191 |
| 4,293,050 | 10/1981 | Goloff et al. | 180/6.26 |
| 4,296,647 | 10/1981 | Kemper | 74/690 |
| 4,378,708 | 4/1983 | Pouliot | 74/191 |
| 4,495,829 | 1/1985 | Kemper | 74/191 |

FOREIGN PATENT DOCUMENTS

WO81/03369 11/1981 PCT Int'l Appl.
WO83/03291 9/1983 PCT Int'l Appl.

OTHER PUBLICATIONS

ASME Publication Entitled "Performance of a Nutating Traction Drive" Dated: Aug. 18-21, 1980 by P. Elu and Y. Kemper.

Primary Examiner—Leslie A. Braun
Assistant Examiner—Michael D. Bednarek
Attorney, Agent, or Firm—Charles E. Lanchantin, Jr.

[57] ABSTRACT

A compact nutating traction drive transmission is disclosed having particular utility in a vehicle as a steering differential. The transmission includes an input body rotatable about a central axis, first and second cone-like members rotatably mounted on the body on an inclined axis, and a pair of traction rings reacting against the respective cone-like members. A first embodiment includes a tubular shaft and a solid main shaft which are rotatably mounted and pilotably interconnected along the inclined axis, and a coupling apparatus is utilized for transmitting torque independently from the cone-like members to their respective shafts. Similar axially compact gear trains are driven by the respective shafts which have a construction and gear train ratio sufficient for maximizing the effectiveness of the transmission. A second embodiment includes a tubular shaft, a solid shaft, and an extension shaft connected to the second cone-like member for providing a greater resistance to bending centrally thereof than the first embodiment.

52 Claims, 6 Drawing Figures

FIG-5

NUTATING TRACTION DRIVE TRANSMISSION

DESCRIPTION

1. Technical Field

This invention relates generally to continuously variable transmissions, and more particularly to a nutating traction drive transmission for transmitting torque to a pair of independently and continuously controlled output members.

2. Background Art

There have been a number of single output, continuously variable transmission units proposed of the type disclosed in U.S. Pat. No. Re. 30,981, reissued June 29, 1982 to Yves Kemper. Such nutating traction drive transmissions, hereinafter referred to as NTD transmissions, employ three working bodies to transmit torque to a rotatable output member at a continuously variable output/input speed ratio throughout a preselected range. The working bodies are represented by a first body having a pair of axially movable internal traction surfaces of revolution about a central axis, a second body having a pair of external cone-like traction surfaces of revolution about an inclined or nutating axis intersecting the central axis, and a third body journalled for rotation about the central axis and carrying the second body such that rotational torque applied to the third body causes the nutational movement of the inclined axis. If the first body is held stationary as a reaction and the third body is driven as an input member, the second body can have a nutating pinion gear coupled thereto which can serve as the output to a gear train. Axial movement of the first body with respect to the cone-like traction surfaces of the second body results in modifying the speed ratio to the output desired. The technical performance and operating parameters of these NTD transmissions are described in an American Society of Mechanical Engineers article entitled "Performance of a Nutating Traction Drive" by P. Elu and Y. Kemper of Aug. 18–21, 1980 and identified as Paper No. 80-C2/DET-63.

Despite the advantages offered by the prior NTD transmissions, they have not yet been so constructed and arranged as to provide in a practical manner two independent output torque paths that could be utilized, for example, as a vehicle steering differential. U.S. Pat. No. 4,267,749 issued May 19, 1981 to Robert O. Chambers et al and U.S. Pat. No. 4,293,050 issued Oct. 6, 1981 to Alexander Goloff et al represent differential mechanisms that have incorporated separated pairs of NTD transmissions driven by a common input member. But the duplication of elements, the excessive width of the elements, and the complex structure required to contain and support components revolving around two inclined axes makes these mechanisms relatively unattractive from both an overall cost standpoint and a vehicle adaptability standpoint.

U.S. Pat. No. 4,296,647 issued Oct. 27, 1981 to Yves J. Kemper illustrates another NTD differential transmission drive that has a number of advantages including compactness and dual output capability. However, one problem with that construction is that the traction rings cannot be positioned next to each other because of the centrally located actuator mechanism, and this increases the size of the transmission. Another problem is that the cone-like members thereof are hydraulically urged apart and toward the traction rings under considerable pressure causing sealing problems. Another disadvantage is that the screw-type mechanisms for axially moving the traction rings are interconnected which adds complexity to the control system. A further disadvantage is that relatively large diameter bearings are used to rotatably support the large diameter ends of the cone-like members within the carrier, and this causes high power losses. And, a still further complication is that the output gear train construction used therewith is not as compact as desired when the transmission is mounted transversely between the two tracks of a track-type vehicle.

Accordingly, what is needed is a simple, sturdy and compact NTD transmission having a pair of independently and continuously controlled output members sufficient, for example, for use of the NTD transmission as a vehicle steering differential. In addition, the NTD transmission should preferably be so constructed and arranged as to mechanically urge the coaxially aligned cone-like members apart in response to the level of the output torque while minimizing the deflection thereof as a result of the non-symmetry of the high contact forces generated by their contact with the traction rings during steering. Further, the NTD transmission should preferably incorporate a pair of compact output gear trains having a construction which provides the desired gear ratio and a speed ratio range including a low value approaching zero, while transmitting the highest torque loadings to the output members through the reaction against the large diameter ends of the cone-like members. And still further, the traction rings should preferably be fully independently controlled for simplicity and be able to be positioned next to each other for compactness.

DISCLOSURE OF THE INVENTION

The present invention is directed to overcoming one or more of the above problems.

In one aspect of this invention there is provided a NTD transmission having a body rotatable about a central axis, first and second cone-like members rotatably mounted on the body on an inclined axis, and a pair of traction rings individually reacting against one of the cone-like members. Advantageously, first and second shafts are rotatably mounted on the inclined axis within the cone-like members, and coupling means are provided for transmitting torque independently from the first cone-like member to the first shaft and from the second cone-like member to the second shaft in response to rotating the body and independently moving the traction rings.

In another aspect of the invention a NTD transmission includes a driven input body rotatable about a central axis, first and second cone-like members carried by the body on an inclined axis, first and second traction rings frictionally engaging the respective cone-like member, bearing means for supporting the small ends of the cone-like members in the body, and shaft means for internally structurally supporting the large ends of the cone-like members, maximizing resistance to radial deflection thereof, and permitting independent rotation thereof.

In a further aspect of the invention a NTD transmission is provided having a carrier rotatable about a central axis, first and second cone-like members rotatably supported in back-to-back relation by the carrier on an inclined axis, first and second traction rings individually contacting one of the cone-like members, and means including first and second shafts for transmitting torque independently away from the first and second cone-like members along the inclined axis in response to rotation of the carrier and independent axial movement of the traction rings frictionally against the respective cone-like member.

More particularly, a first embodiment of the NTD transmission has two independent shafts so interconnected or nested within the cone-like members as to be particularly compact and sturdy. One of the shafts is tubular, and the other shaft is solid and extends within the tubular shaft and for substantially the full length of both cone-like members in order to provide substantial rigidity to the system. An efficacious bearing arrangement is incorporated for supporting the various elements, and a self-energizing ball and ramp type mechanical separating mechanism is operatively associated with each of the shafts for urging the cone-like members apart and positively against the traction rings. Advantageously, the NTD transmission provides an output gear train ratio of about $+0.9$ and an output/input speed ratio range from near zero to $-1.05$ that is compatible with the cone-like members so that the large diameter ends thereof transmit the higher torque loads. A second embodiment of the NTD transmission is also disclosed which has several of the desirable features of the first embodiment and has less deflection. The solid shaft is made in two separated parts, one being releasably secured to one cone-like member to increase the desired internal rigidity, the other being used to transmit the output torque to the ball ramp.

BEST MODE FOR CARRYING OUT THE INVENTION

Figure 1:
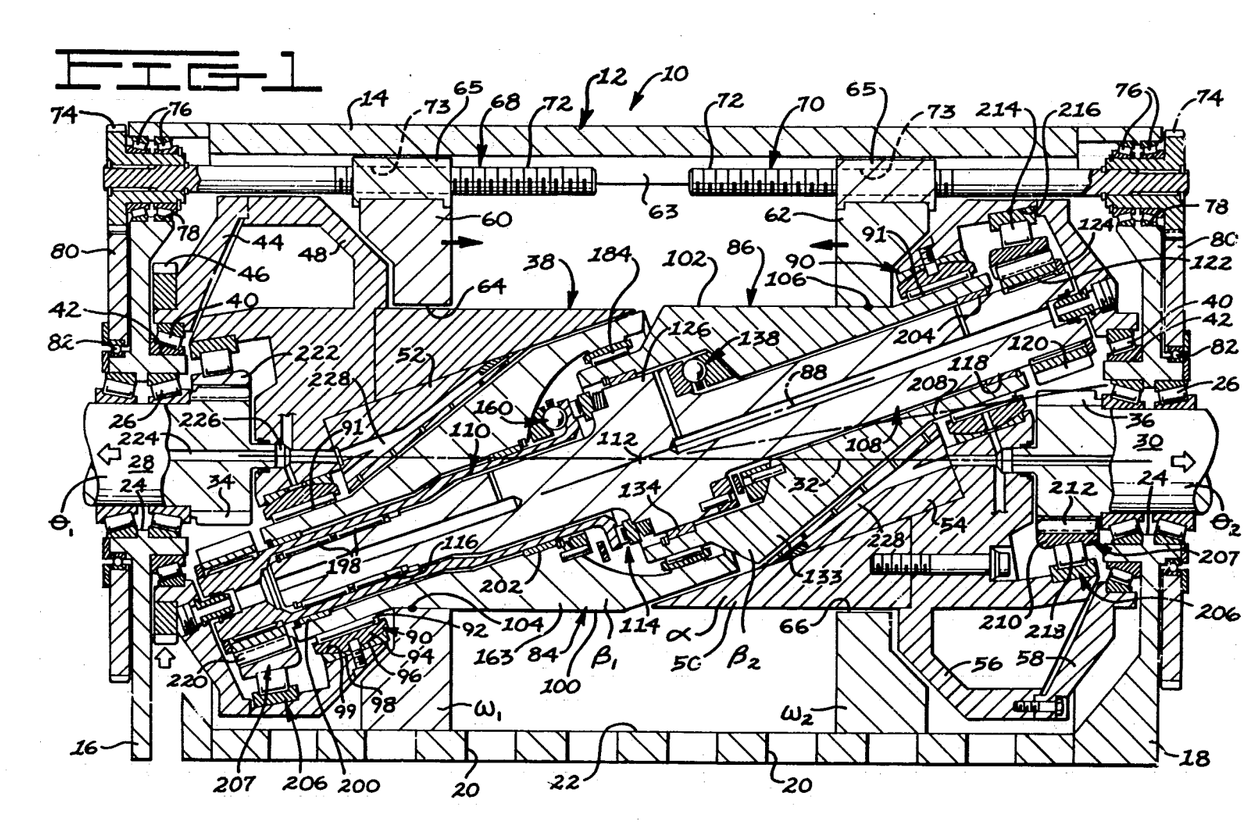
FIG. 1 is a diagrammatic, cross-sectional view through a first embodiment NTD transmission.

A first exemplary embodiment of a nutating traction drive transmission 10 is illustrated in FIG. 1 in conjunction with a housing 12 including a centrally located tubular shell 14 and left and right end walls 16 and 18, respectively, releasably connected to the opposite ends of the shell. A plurality of drain ports 20 are defined in the shell about its periphery which extend radially outwardly from an internal cylindrical surface 22. A stepped bore 24 is defined centrally in each of the end walls and an opposed pair of tapered roller bearing assemblies 26 are seated in each of the stepped bores for rotatably supporting therein left and right output shafts 28 and 30, respectively, along a central axis 32. Left and right output spur pinion gears or theta members 34 and 36, respectively, are integrally defined on the inner ends of their respective shafts.

An input alpha body or carrier 38 is supported for rotation about the central axis 32 on a tapered roller bearing assembly 40 mounted on an inwardly facing seat 42 formed on each of the end walls 16 and 18. The carrier includes in serially related order: left end member 44 having an input gear 46 thereon, a left contoured or hollow flange member 48, a hollow central member 50 having disposed therein left and right manifold members 52 and 54, respectively, a right contoured or hollow flange member 56, and a right end member 58. These members are releasably connected together by a plurality of fasteners and are separately made for reasons of manufacturing convenience. Moreover, they may be made of different materials such as steel and aluminum to better control the strength and rotational mass of the carrier.

A left traction ring 60 forming a part of the first omega body and a right traction ring 62 forming a part of the second omega body are mounted within the housing 12 for non-rotational, but axially guided movement within the internal cylindrical surface 22 and along the central axis 32. These traction rings define interior rolling surfaces 64 and 66, respectively, which are surfaces of revolution about the central axis and preferably are slightly crowned in cross section. In order to prevent rotation of the traction rings within the housing, three axially oriented grooves or keyway slots 63, one shown centrally at the top of FIG. 1, are peripherally defined within the tubular shell 14 about 120° apart. And, three guide blocks 65 are mechanically secured to each of the traction rings which are adapted to travel along these keyway slots. The traction rings are individually axially moved by fully independent left and right screw-type control mechanisms 68 and 70, respectively. Each of these mechanisms includes three parallel screws 72, one of which is shown at each side in axially aligned relation. The screws extend through internally threaded bores 73 in the guide blocks and individually have a drive gear 74 on the outer end thereof. The drive gears are individually rotatably supported by a pair of tapered roller bearing assemblies 76 seated in suitably stepped apertures 78 formed in the respective end walls 16 and 18. A ring gear 80 is intermeshed with the three drive gears at each end of the housing 12 and is rotatably mounted on the central axis on its associated end wall 16 or 18 by a bearing assembly 82.

The NTD transmission 10 also includes a pair of first and second oppositely convergent cone-like members 84 and 86 forming significant portions of the corresponding frusto-conical beta bodies, and which are in part rotatably supported in back-to-back relation within the carrier 38 along an inclined or nutating axis 88 by a pair of spherically seated roller bearing assemblies 90. Particularly, the axially outer distal or small cylindrical end 91 of each of the cone-like members is supported by a roller or needle bearing 92 acting on an outer race 94 having a spherical external surface 96 which comprises each bearing assembly 90. The outer race 94 at each side is supported for universal movement in an annular seat 98 having a spherical internal surface 99 mounted in their respective flange members 48 or 56 on the nutating axis 88.

The first and second cone-like members 84 and 86, respectively define conical rolling surfaces 100 and 102 which individually engage their associated rolling surfaces 64 and 66 of the traction rings 60 and 62 at generally diametrically opposite and axially offset points or regions as can be visualized by reference to FIG. 1 and the numerals 104 and 106, respectively. Because the traction rings are independently axially movable for selectively operating the cone-like members at different speeds, a first shaft or extended length solid shaft 108 and a second shaft or foreshortened tubular shaft 110 are provided to independently deliver the output torque therefrom. The solid shaft is telescopingly nested within the tubular shaft for a significant length along the nutating axis and the extended length and cross sectional strength of the solid shaft reduces radial deflection thereof especially at the center adjacent an intersection point 112 of the inclined axis 88 with the central axis 32. In addition, separating means or coupling means identified generally by the reference numeral 114 are provided for continually urging the cone-like members 84 and 86 apart with a substantial force against the respective traction rings 60 and 62 and for transmitting driving torque between each cone-like member and its respectively associated shaft.

More specifically, the main solid shaft 108 extends substantially the full length of both cone-like members 84 and 86 along the inclined axis 88. It has opposite cylindrical end portions 116 and 118 and a pinion gear 120 releasably connected to the right end portion 118 by a spline joint 122 and a conventional screwthreaded locking device 124. As shown best in FIG. 2, the main shaft also defines a centrally located enlarged flange 126 providing a cylindrical external surface 128 and oppositely outwardly facing stepped seats 130 and 132. The right cone-like member 86 has a hollow enlarged end 133 rotatably supported on the external surface 128 of the main shaft by a sleeve or roller bearing 134. A spherical internal surface 136 is defined within the hollow of the right cone-like member and has a first ball and ramp separating mechanism 138 of the coupling means 114 universally seated thereon.

Figure 2:
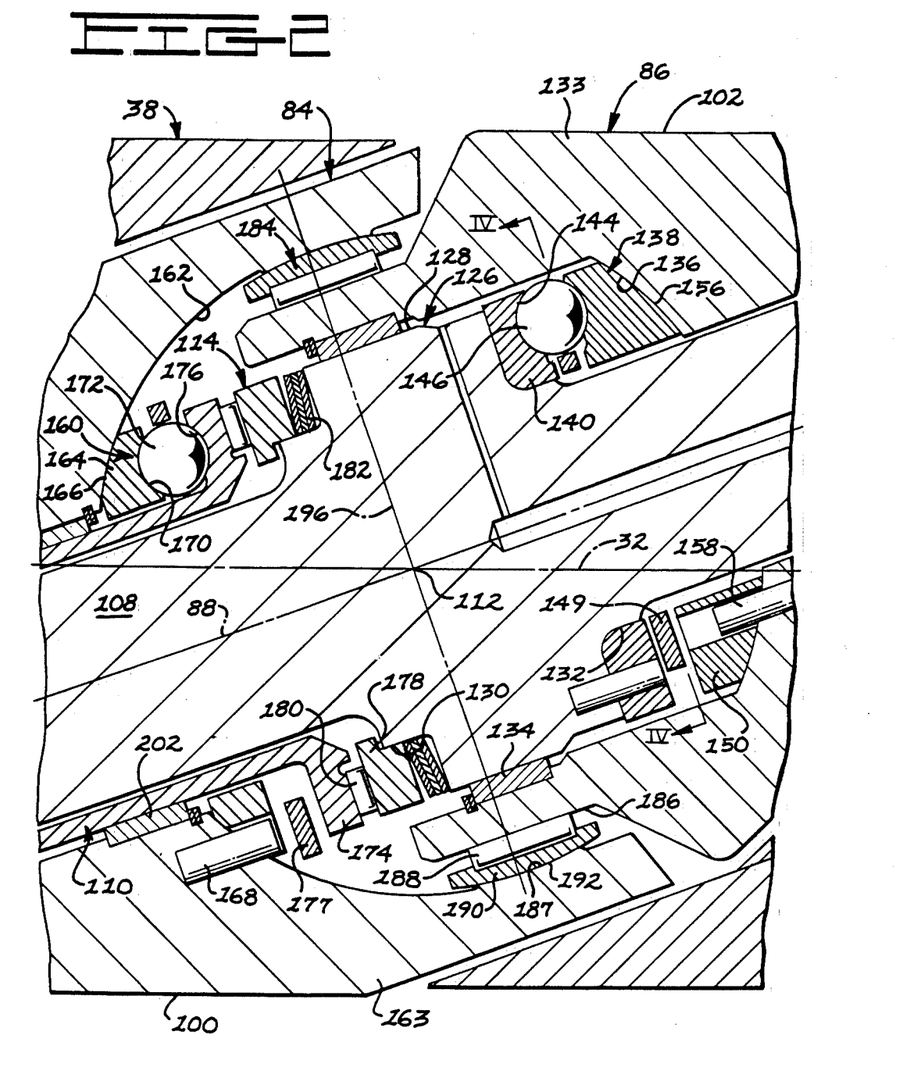
FIG. 2 is an enlarged fragmentary cross-sectional view of FIG. 1 at the centralmost part thereof to better illustrate details of construction thereof.
Figure 3:
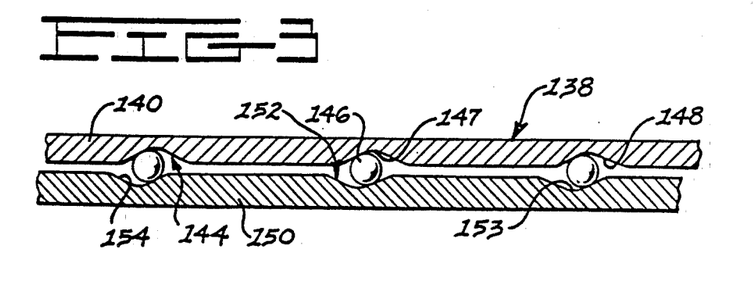
FIG. 3 is a diagrammatic, and developed view of one of the separating mechanisms shown in FIGS. 1 and 2 showing the relationship of the ball bearing elements and inclined ramps on the respective members.
Figure 4:
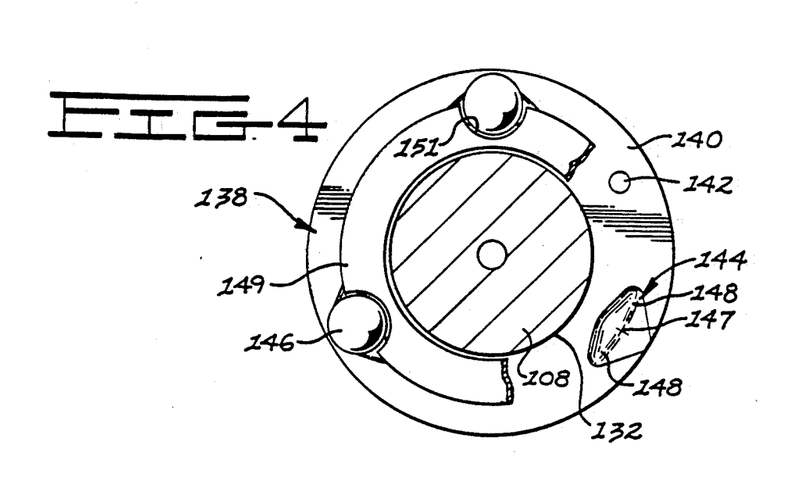
FIG. 4 is a sectional view taken along line IV—IV of FIG. 2 at a reduced scale.

Referring to FIGS. 2, 3 and 4, the ball and ramp separating mechanism 138 includes an axially inner annular member 140 mounted on the stepped seat 132 of the main shaft 108 and releasably secured thereto by a retaining dowel or other conventional fastener, and which has three outwardly facing pockets 144. Each of the pockets has an arcuately concave shaped cross-section in the radial direction to receive a ball bearing element 146 therein. And, in the circumferential direction, each of the pockets is symmetrically triangularly structured away from a centrally located point 147 to define axially outwardly extending inclined ramps 148. A retaining ring 149 having three radially outwardly facing recesses 151 is used for holding the ball bearing elements in position during assembly of the NTD transmission 10. An axially outer annular member 150 has a corresponding plurality of axially inwardly facing pockets 152 for receiving the same ball bearing elements 146. Each of the pockets 152 also defines a centrally located point 153 and inclined ramps 154 extending away therefrom, and the member 150 has a spherical external surface 156 self-centeringly or floatingly seated against the corresponding internal surface 136 of the cone-like member 86. A retaining dowel 158 connects the outer annular member to the cone-like member for joint rotation, but allows a limited degree of seating movement thereof to accommodate the alignment thereof to the single plane defined by the three ball bearing elements.

The coupling means 114 further includes a second ball and ramp separating mechanism 160 which is universally seated on a spherical internal surface 162 defined in a hollow enlarged end 163 of the left cone-like member 84. Like the first ball and ramp separating mechanism 138, this one has an axially outer annular member 164 defining a spherical external surface 166 that is allowed to self-centeringly or floatingly engage the corresponding surface 162 because it is connected for joint rotation with the cone-like member by a loose fitting retaining dowel 168. The annular member 164 also defines three axially inwardly facing pockets 170 in which are disposed three ball bearing elements 172, but in this instance the left axially inner member corresponding to the right annular member 140 described previously is an integral flange portion 174 of the tubular shaft 110. The flange portion 174 defines three axially outwardly facing pockets 176 for receiving the ball bearing elements in a manner comparable to FIG. 3. Another retaining ring 177 is used for the same purpose as retaining ring 149.

As shown in FIG. 2, the coupling means 114 further includes a thrust washer 178 axially movably mounted or piloted on the stepped seat 130 and sandwiched between a thrust bearing assembly 180 on one side and a plurality of Belleville washers 182 or other form of resiliently compressible spring element on the other. Upon full assembly of the NTD transmission 10 the Belleville washers exert a preselected preload tending to move the solid shaft 108 and annular member 140 to the right when viewing FIG. 2 and the thrust washer 178 and tubular shaft 110 to the left.

Another universally mounted or spherically seated roller bearing assembly 184 is disposed between the enlarged end 163 of the left cone-like member 84 and the enlarged end 133 of the right cone-like member 86. Specifically, the right cone-like member has an external cylindrical surface 186 disposed generally within a spherical internal surface 187 formed in the left cone-like member, and a roller or needle bearing 188 seats against the cylindrical surface and against an outer race 190 having an external spherical surface 192. Note that the central plane of the self-aligning roller bearing assembly 184 and the central plane of the sleeve bearing 134 are disposed adjacent and parallel to a plane 196 transverse to the inclined axis 88 and passing through intersection point 112 in order to minimize the loads on bearings 188 and 134.

Referring next to FIG. 1, a pair of needle bearings 198 are disposed between the end portion 116 of the main solid shaft 108 and the interior of the tubular shaft 110 substantially in transverse alignment with the self-aligning bearing assembly 90. Also, a sleeve bearing 200 is disposed in generally transverse alignment therewith between the exterior of the tubular shaft and the small end 91 of the left cone-like member 84. Another sleeve bearing 202 is disposed between the exterior of the tubular shaft and the left cone-like member adjacent the left separating mechanism 160 or nearer to the enlarged end 163. Lastly, another sleeve bearing 204 is located between the end portion 118 of the solid main shaft and the small end 91 of the right cone-like member 86.

The NTD transmission 10 includes an output gear train 206 at each end thereof, and a description of the right one when viewing FIG. 1 will suffice for the left one. The pinion gear 120 is connected for joint rotation with the solid shaft 108 and is thereby rotatably mounted on the carrier 38 on the inclined axis 88. The output pinion gear 36 is integral with the right output shaft 30 on the central axis 32. Advantageously, the gear train also includes an internal gear mechanism 207 for transferring torque between the carrier 38, the pinion gear 120, and the output pinion gear 36, with the internal gear mechanism being rotatably mounted on the carrier on another inclined axis 208 preferably disposed in a common rotatable plane with the axes 32 and 88 and located halfway between them. The internal gear mechanism includes an internal ring gear 210 having a plurality of straight, internally tapered gear teeth 212 which are intermeshed with the teeth of both of the straight spur pinion gears 36 and 120. A roller bearing assembly 214 is pressed into an internal cylindrical seat 216 formed within the right flange member 56 of the carrier and rotatably supports an external, shouldered cylindrical surface 218 formed on the internal ring gear concentric with the inclined axis 208. Thus, the internal ring gear 210 is externally supported for rotation within the carrier. At the opposite end of the transmission the output pinion gear 34 is drivingly connected to a pinion gear 220 by a similar internal ring gear 222. The pinion gear 220 is connected for joint rotation with the tubular shaft 110 in a manner like the opposite pinion gear 120 is connected to the main shaft. Further specifics of the compact output gear train 206 are set forth in International Application Publication No. WO83/03291 to Robert O. Chambers and published Sept. 29, 1983 under the Patent Cooperation Treaty (PCT), the full contents of which are incorporated herein by reference.

A lubrication passage 224 extends axially inwardly through each one of the output shafts 28,30 into a chamber 226 defined between each of the output shafts and the carrier 38. A plurality of passages 228 in the carrier thereafter controllably distribute a cooling and lubrication fluid to the various bearings and to the external surfaces 100 and 102 of the cone-like members 84,86 as required. In this regard, commercially available traction fluids are preferably utilized to enhance the transmission of torque between the associated friction contact surfaces, as at the regions 104 and 106, and as can be appreciated by those knowledgeable in the art.

Figure 5:
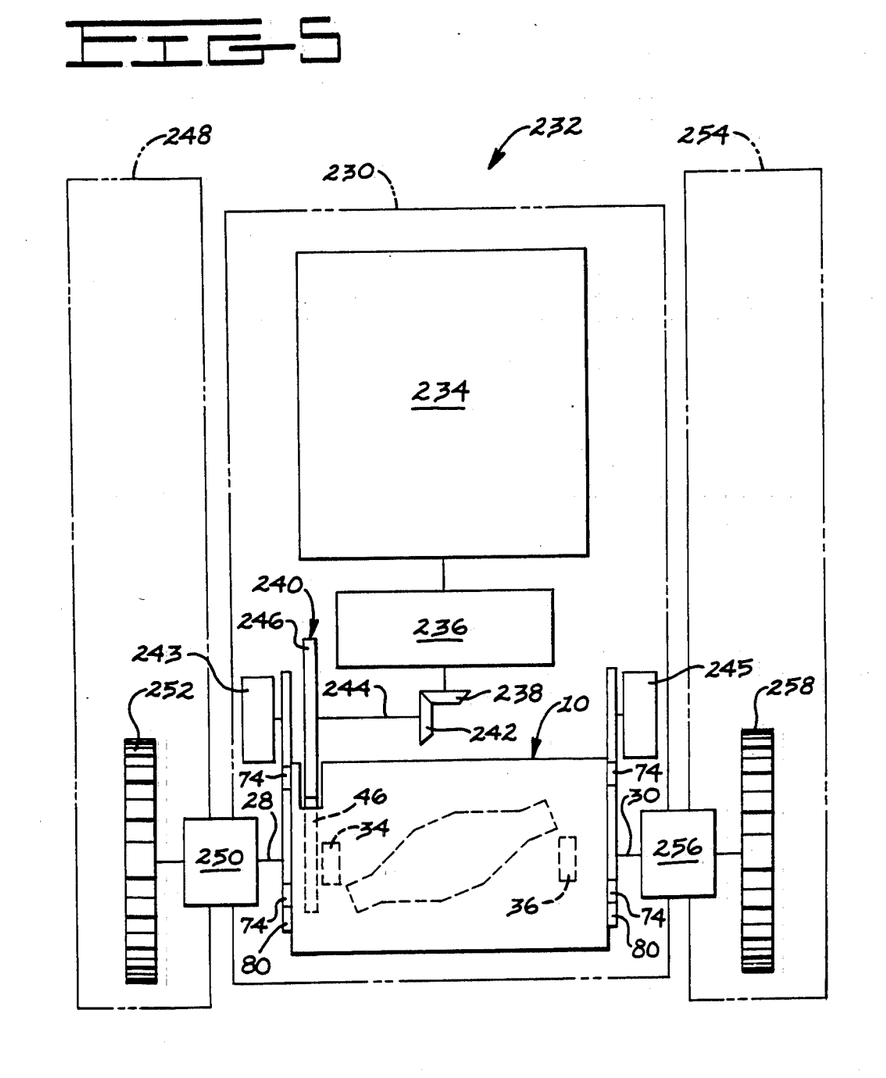
FIG. 5 is a diagrammatic plan view of a track-type vehicle employing the NTD transmission as a steering differential in accordance with one aspect of the present invention.

In the example of FIG. 5 the NTD transmission 10 is shown as being mounted on a frame 230 of a track-type vehicle 232 near the rear portion thereof where it serves as a steering differential. An engine 234 is mounted on the front of the frame and drives a dual clutch reversing gear unit 236 so that an output bevel gear 238 can be held in neutral or can be selectively rotated in either direction. A transfer gear train 240 including a bevel gear 242, a cross shaft 244, and a drive gear 246 delivers power from the bevel gear 238 to the input gear 46 of the transmission. The transmission then independently drives the left output shaft 28 and right output shaft 30. In this example the output shafts are adapted to respectively drive a left endless track chain 248 via a final drive 250 and a sprocket 252, and a right endless track chain 254 via a final drive 256 and a sprocket 258. However, it should be appreciated that the NTD transmission 10 can power rubber tired wheels or the like equally as well.

FIG. 5 also illustrates left motor means 243 and right motor means 245 for controllably rotating one of the drive gears 74 at each side for obtaining the desired speed ratio at each side of the NTD transmission 10. As stated previously with respect to FIG. 1, the drive gears 74 position the traction rings 60 and 62 through the respective screws 72 for the adjustment of the speed ratio.

INDUSTRIAL APPLICABILITY

In a first mode of operation of the NTD transmission 10 corresponding to minimum output speed the left and right traction rings 60 and 62, respectively, are disposed close together or almost touching with their interior rolling surfaces 64 and 66 in contact with the respective rolling surfaces 100 and 102 at the large ends 163 and 133 of the cone-like members 84 and 86. With the engine 234 shown in FIG. 5 providing power at a preselected speed, the reversing gear unit is initially neutralized so that the bevel gear 238 is not rotating. However, although not illustrated, the conventional internal forward clutch of the gear unit 236 can subsequently be actuated to rotate the bevel gear 238 in a forward condition. Assuming that the input gear 46 is driven at 1800 rpm, for example, then the carrier 38 is rotated at this speed in a clockwise direction when viewing FIG. 1 from the right along central axis 32. The right cone-like member 86 is substantially locked for joint rotation with the main shaft 108 by the self energizing ball and ramp separating mechanism 138, and since the right cone-like member is in contact with its respective stationary traction ring it rotates in a counterclockwise direction as does the right pinion gear 120. The ring gear 210 serves as an idler and the output pinion gear 36 rotates in a counterclockwise direction at a speed near zero. If the number of gear teeth in the pinion gear 120 is 18 and the number of gear teeth in the output pinion gear 36 is 20 then the output gear train ratio k is +0.9. Using an overall efficiency VS speed ratio graph, not shown but of the type illustrated in FIG. 4 of ASME Paper No. 80-C2/DET-63 mentioned above, an abacus may be constructed as explicitly explained in that paper to define a reference point corresponding to a first RHO value of 0.86 and corresponding to operating the traction rings at the large ends 163 and 133 of the cone-like members 84 and 86. In connection with the term RHO value, it is meant the geometric ratio of the working radius of the respective cone-like member to that of the corresponding traction ring. By extending a line downwardly through the two points so defined to the abscissa axis a point is found corresponding to the overall speed ratio. In the instant embodiment that point is slightly to the left of the zero axis when reading the graph indicating that the right output pinion gear 36 is rotating in a direction opposite to that of the input carrier 38 and at a very low rate of speed. Left output pinion gear 34 is, of course, rotating at the same speed and in the same direction as the right output pinion gear since the traction rings 60 and 62 are symmetrically positioned.

As the traction rings 60 and 62 are moved symmetrically axially apart from the juxtaposed positions described above, the speed of the output pinion gears 34 and 36 continues to increase in the opposite direction of rotation to the input in a progressing and smooth manner. This is accomplished by simultaneously rotating one of the drive gears 74 at each side of the vehicle 232 by the respective motor means 243 and 245 as can be visualized by reference to FIG. 5. These drive gears subsequently rotate the ring gears 80, the other ones of the drive gears 74, and the screws 72 received in the respective traction rings. When the traction rings reach the maximum spread-apart condition shown in FIG. 1, an operational ratio is obtained corresponding to a second RHO value of 0.433. By extending another line through the +0.9 gear train ratio point and the second RHO value point down to the absissa of the aforementioned graph, a speed ratio of about −1.05 is obtained. Accordingly, the output pinion gears 34 and 36 are rotated at about 1887 rpm in a counterclockwise direction.

Rather than operating the vehicle 232 in the straight-ahead traveling mode as just described, the NTD transmission 10 can be used as a steering differential. For this purpose the traction rings 60 and 62 are independently positioned by the motor means 243 and 245 through a suitable operator-actuated control system, not shown. If the left traction ring 60 is maintained in the position illustrated in FIG. 1, and the right screws 72 are rotated to gradually move the right traction ring 62 axially inwardly the speed of the right output pinion gear 36 is continuously decreased. As can be visualized with reference to FIG. 5, decreasing the speed of right output shaft 30 and right drive sprocket 258 while maintaining a relatively high rotational speed of left output shaft 28 and left drive sprocket 252 causes the tractor to turn to the right while traveling forwardly. Since the traction rings are fully independent, substantially any vehicle ground speed can be obtained within a preselected range, and at each level one traction ring can be moved axially at a relatively fast rate due to rapid rotational adjustment of the screws 72 relative to the other to steer or turn the vehicle in the direction desired.

In connection with the self-energizing ball and ramp separating mechanisms 138 and 160 it should be appreciated that when there is no torque loading on the output shafts 28 and 30 the ball bearing elements 146 and 172 reside in an inactive position in the central positions 147 and 153 of their respectively associated pockets 144 and 152, and 170 and 176. Moreover, the respective pockets would be axially aligned in a symmetrically facing relationship. However, if one output shaft exhibits a greater torque loading, then the associated separating mechanism on that side provides the full force tending to spread the cone-like members 84 and 86 apart. For example, if the right output shaft 30 exhibits the highest torque loading, then the ball elements 146 of right separating mechanism 138 travel up the opposed ramps 148 and 154 to provide a relatively large separating force. Simultaneously, the ball elements 172 in the left separating mechanism 160 remain in an inactive condition. It should now be recognized that the two shafts 110 and 108 normally jointly rotate with their respective cone-like members 84 and 86, but are permitted a limited amount of rotational and axial movement therebetween by the separating mechanisms.

SECOND EMBODIMENT

Figure 6:
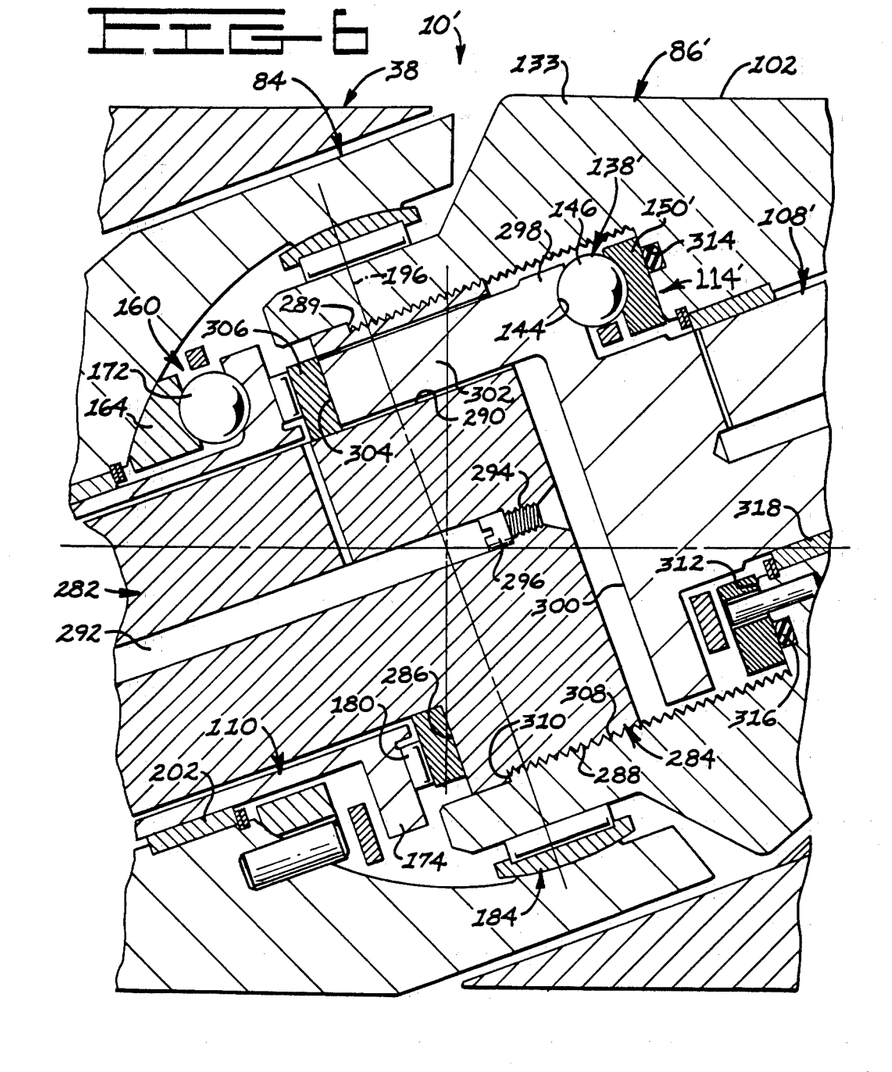
FIG. 6 is a fragmentary cross-sectional view of a second embodiment NTD transmission which can be compared with the first embodiment construction illustrated in FIG. 2.

A second exemplary embodiment NTD transmission 10' is illustrated in FIG. 6 which has a number of components similar in structure and/or function to those of the first exemplary embodiment shown in FIG. 2. Such similar components are identified with reference numerals identical to those fully described in connection with the first exemplary embodiment. On the other hand, comparable components which have been structurally modified have the same reference numerals with a prime mark indicator appended thereto in order to allow a convenient comparison therebetween.

The embodiment shown in FIG. 6 differs from the structure shown in FIGS. 1 and 2 in that the solid shaft 108' does not extend for substantially the full length of both cone-like members 84 and 86' but only for substantially the length of the right cone-like member 86'. Rather, an extension shaft 282 is releasably secured to the right cone-like member 86' and is jointly rotatable therewith. Although not illustrated, the axially outer end of extension shaft 282 is rotatably supported within the tubular shaft 110 by the needle bearings 198 described earlier in connection with FIG. 1. The axially inner end of the extension shaft 282 has an enlarged head or flange 284 defining a thrust surface 286, an externally threaded periphery 288, an inwardly or rightwardly facing annular shoulder 289, and three regularly spaced arcuate slots 290, only one of such slots is shown for illustrative convenience. A passage 292 is defined centrally through the extension shaft and is provided with a threaded bore 294 in order to receive a releasable, lubrication-blocking fastener 296 therein.

The solid shaft 108' has an enlarged head or flange 298 integrally defining the axially outwardly facing pockets 144 of the right separating mechanism 138' and an axially inwardly facing interior end surface 300. Three regularly spaced thrust pedestals or fingers 302, one shown, having axially inwardly facing end surfaces 304 are also integrally formed on the flange. These fingers extend to the left when viewing FIG. 6 through the respective arcuate slots 290 in the extension shaft so that the end surfaces 304 are adapted to contact an annular thrust washer 306 of preselected thickness.

The hollow portion of the enlarged end 133 of the right cone-like member 86' defines an internally threaded bore 308 and a leftwardly facing shoulder 310 therewithin. During the assembly of the NTD transmission 10' the extension shaft 282 is screwthreadably secured to the right cone-like member 86' with the shoulder 289 in abutment with the shoulder 310. A conventional fastening device, not shown, is preferably used to positively lock the extension shaft to the right cone-like member in that position.

The right cone-like member 86' further defines an axially inwardly facing flat surface 312 and an annular groove 314 opening axially outwardly thereon, and a resilient annular element 316 of compressible elastomeric material is seated within the groove. In use, the compressed element 316 is adapted to make continual thrust bearing engagement with the outer annular member 150' of the right separating mechanism 138'. The annular element 316 thereby functions to provide a preload on the ball and ramp separating mechanism 138' and 160 in a manner comparable to the Belleville washers 182 described above with respect to the embodiment of FIG. 2. Specifically, the axial dimensions of these members are closely controlled so that the annular element 316 can continually bias right cone-like member 86' to the right when viewing FIG. 6 against its respective traction ring 62 as can be appreciated by reference to FIG. 1. Simultaneously, the outer annular member 150', the ball elements 146, and the solid shaft 108' are urged to the left. Since the end surfaces 304 of the fingers 302 are pressed against the thrust washer 306, the thrust bearing assembly 180 is forced leftwardly against the integral flange portion 174 of the tubular shaft 110. This force is transmitted through the ball elements 172 of the left separating mechanism 160 so as to continually urge the left cone-like member 84 to the left and against its respective traction ring 60 as can again be appreciated by reference to FIG. 1.

As shown in FIG. 6 a sleeve bearing 318 is disposed between the solid shaft 108' and the right cone-like member 86'. The bearing 318 is comparable to the sleeve bearing 134 shown in FIG. 2.

The NTD transmission 10' of FIG. 6 operates in a manner functionally similar to the NTD transmission 10 of FIG. 1. When the torque on the output shafts 28 and 30 increases from zero to a predetermined threshold, the ball elements 146 and 172 remain centered in their respective pockets 144 and 152, and 170 and 176 as can be visualized by reference to FIG. 3. Simultaneously, the fingers 302 are positioned centrally within the arcuate slots 290. When the torque increases beyond that threshold the ball elements begin to travel up the inclined ramps 148 and 154 at that side of the transmission experiencing the torque increase. Activating one of the ball and ramp separating mechanisms 138' and 160 progressively compresses the resilient element 316 until the annular member 150' bottoms out on the flat surface 312. The fingers 302 transmit the forces associated with urging the cone-like members 84 and 86' apart while simultaneously rotating several degrees within the arcuate slots. For example, a relatively limited rotational angle of about 10 to 15 degrees between the extension shaft 282 and the solid shaft 108' is provided for the self-energizing separating feature. When the output torque is constant these elements and the right cone-like member 86' rotate together as a unit. If the output torque is equal but reversed, then the fingers 302 would travel the same relatively limited rotational angle away from the centermost slot position but in a direction toward the opposite ends of the slots.

In view of the above it is apparent that a compact NTD transmission 10 is provided which is extremely useful for a vehicle steering differential. The first embodiment of the transmission incorporates a solid main shaft 108, a tubular shaft 110 and a system of bearing supports providing maximum structural integrity. It also incorporates coupling means 114 for transmitting torque from the respective cone-like members 84 and 86 to their respective shafts using fully mechanical, self-energizing, back-to-back ball and ramp separating mechanisms 138 and 160. Such coupling means keeps the thrust forces resulting from contact of the cone-like members 84 and 86 against their respective traction ring 60 and 62 equal and opposite so that external thrust bearings are not required. Furthermore, the extended length solid shaft 108 provides the necessary support to hold the two cone-like members substantially coaxial with the nutating axis 88, principally when the traction rings 60 and 62 are not positioned symmetrically from the point 112. Moreover, the duplication of the axially compact output gear trains 206, using internally tapered gears 210 and 222 rotatably mounted on the carrier 38, contributes substantially to keep the length of the transmission to a minimum.

The second embodiment transmission 10' also has several of the aforementioned desirable features of the first embodiment transmission 10, but incorporates an extension shaft 282 releasably secured to one of the cone-like members in addition to the output tubular shaft 110 and the output solid shaft 108 for reducing by half the deflection of the assembly under the non-symmetrical loads generated when the vehicle is steering.

The transmissions 10 and 10' can also be used with different output gear ratios such as those disclosed in previously mentioned ASME Paper No. 80-C2/DET-63. Any output gear train having a ratio of +0.5 for example, can provide an output/input speed ratio that can be either positive or negative with movement of the traction rings. Hence, each of the output shafts could be reversed in their direction of rotation without requiring a separate reversing gear unit and without departing from the spirit of the present invention.

Other aspects, objects and advantages of this invention can be obtained from a study of the drawings, the disclosure and the appended claims.

I claim:

1. In a nutating traction drive transmission of the type having a body rotatable about a central axis, first and second cone-like members rotatably mounted on the body on an inclined axis intersecting the central axis, and a pair of traction rings individually reacting against respectively associated surfaces of the cone-like members, the improvement comprising:
   a first shaft mounted within the first cone-like member on the inclined axis;
   a second shaft mounted within the second cone-like member on the inclined axis; and
   coupling means for transmitting torque independently from the first cone-like member to the first shaft and from the second cone-like member to the second shaft in response to rotation of the body and independent movement of the traction rings along the central axis.

2. The transmission of claim 1 wherein the first shaft is generally tubular and the second shaft is generally solid.

3. The transmission of claim 2 including an extension shaft connected for joint rotation with the second cone-like member and extending within the tubular first shaft for resistance to bending.

4. The transmission of claim 2 wherein the second shaft extends within the tubular first shaft for resistance to bending.

5. The transmission of claim 4 wherein the second shaft has a centrally located flange.

6. The transmission of claim 5 wherein the coupling means includes a first separating mechanism located generally between the first cone-like member and the flange and a second separating mechanism located generally between the second cone-like member and the flange.

7. The transmission of claim 6 wherein each of the separating mechanisms includes three ball bearing elements seated in pockets of preselected self-energizing ramp profile.

8. The transmission of claim 1 wherein the coupling means includes resilient means for resiliently urging the cone-like members apart and against the respective traction ring.

9. The transmission of claim 8 wherein the resilient means includes a plurality of Belleville washers.

10. The transmission of claim 1 wherein the coupling means includes a first separating mechanism acting between the first cone-like member and the first shaft, and a second separating mechanism acting between the second cone-like member and the second shaft.

11. The transmission of claim 10 wherein the coupling means includes resilient means for continually urging the first separating mechanism toward the first cone-like member and the second shaft toward the second separating mechanism.

12. The transmission of claim 11 wherein the resilient means includes a thrust bearing, a washer, and a plurality of compression spring elements.

13. The transmission of claim 12 wherein the compression spring elements are Belleville washers.

14. The transmission of claim 1 wherein each of the cone-like members is rotatably connected to the body by a spherically seated roller bearing assembly.

15. The transmission of claim 14 wherein the first shaft is generally tubular and is rotatably supported within the first cone-like member by a pair of spaced apart bearings.

16. The transmission of claim 15 wherein the second shaft is generally solid and is rotatably supported within the second cone-like member by a plurality of bearings.

17. The transmission of claim 1 including a first pinion gear on the first shaft, a second pinion gear rotatably mounted on the central axis, and an internal ring gear intermeshingly connecting the first and second pinion gears.

18. The transmission of claim 1 including a first gear on the first shaft and a second gear on the second shaft, the first and second gears being disposed along the inclined axis beyond the opposite ends of the respective cone-like members.

19. The transmission of claim 1 as used in a vehicle having a pair of final drive output members, the first and second shafts being effective to drive the respective final drive output members at independent speeds for steering purposes.

20. The transmission of claim 1 including a third shaft mounted within the first shaft and connected for joint rotation with the second cone-like member.

21. The transmission of claim 20 wherein the third shaft defines slots axially therethrough and the second shaft defines thrust transmitting members which extend through the slots.

22. The transmission of claim 21 wherein the coupling means includes a first ball and ramp separating mechanism located generally between the first cone-like member and the first shaft and a second ball and ramp separating mechanism located generally between the second cone-like member and the second shaft.

23. A nutating traction drive transmission of the type having a body rotatable about a central axis, first and second cone-like members rotatably carried by the body on a second axis inclined with respect to and intersecting the central axis, and first and second traction rings frictionally engaging the respective first and second cone-like members, the improvement comprising:
    bearing means supporting the first and second cone-like members in the body on the second axis;
    shaft means for structurally supporting the cone-like members therewithin and including a first shaft and a second shaft rotatably mounted on the second axis; and
    coupling means for individually transmitting torque from the cone-like members to their respective shaft.

24. The transmission of claim 23 wherein the bearing means includes a pair of spherically seated roller bearing assemblies.

25. The transmission of claim 23 wherein the shaft means includes a spherically seated roller bearing assembly connected between the first and second cone-like members.

26. The transmission of claim 25 wherein the second shaft has a flange and the shaft means includes a sleeve bearing connected between the second cone-like member and the flange.

27. The transmission of claim 23 wherein the first shaft has a first pinion gear connected thereto and the second shaft has a second pinion gear connected thereto.

28. The transmission of claim 23 wherein the coupling means includes a separating mechanism between each of the cone-like members and their respective shaft.

29. The transmission of claim 28 wherein each separating mechanism includes three ball bearing elements seated in pockets of self-energizing ramp profile.

30. A nutating traction drive transmission of the type having a driven input body rotatable about a central axis, first and second cone-like members rotatably carried by the body on a second axis inclined with respect to and intersecting the central axis, and first and second traction rings frictionally engaging the respective first and second cone-like member, the improvement comprising:
    bearing means for rotatably supporting the small ends of the first and second cone-like members in the body on the second axis; and
    shaft means rotatably mounted within the cone-like members on the second axis for internally structurally supporting the large ends of the cone-like members, maximizing resistance to radial deflection thereof, and permitting independent torque delivery from the cone-like members, the shaft means including an extended length shaft extending generally the length of both cone-like members and maintaining the cone-like members coaxially aligned on the second axis.

31. The transmission of claim 30 wherein the shaft means includes first means for drivingly connecting the first cone-like member to the extended length shaft, a second shaft, and second means for drivingly connecting the second cone-like member to the second shaft.

32. The transmission of claim 31 including first and second control mechanisms for independently moving the traction rings and individually including a screw and gear means for rotating the screw.

33. The transmission of claim 31 including first and second output gear trains operatively driven by the respective shafts.

34. The transmission of claim 33 as used in a vehicle having a pair of final drive output members effective to be driven by the respective shafts at independent speeds for steering purposes.

35. A nutation traction drive transmission comprising:
    a carrier rotatable about a central axis;
    first and second cone-like members rotatably supported in back-to-back coaxial relation by the carrier on an inclined axis;
    a bearing radially transmitting loads between the cone-like members;
    first and second traction rings individually contacting one of the cone-like members and providing a reaction thereagainst; and
    means for transmitting torque independently away from the first cone-like member and away from the second cone-like member along the inclined axis in response to rotation of the carrier and independent movement of the traction rings along the central axis and frictionally against the respective cone-like member, the means including a first shaft disposed within the first cone-like member and a second shaft disposed within the second cone-like member.

36. The transmission of claim 35 wherein the first shaft is generally tubular and the second shaft is generally solid.

37. The transmission of claim 36 wherein the second shaft extends within the tubular first shaft.

38. The transmission of claim 37 wherein the second shaft extends generally the length of both cone-like members.

39. The transmission of claim 35 wherein the means includes a self-energizing separating mechanism operatively connecting each of the cone-like members to their respectively associated shaft.

40. The transmission of claim 39 wherein the means includes resilient means for continuously urging the cone-like members apart.

41. The transmission of claim 40 wherein the resilient means includes a plurality of compressible spring elements.

42. A nutating traction drive transmission comprising:
- a carrier rotatable about a central axis;
- first and second cone-like members rotatably supported in the carrier on an inclined axis; and
- means for transmitting torque independently away from the first and second cone-like members along the inclined axis and including an elongate main shaft and a foreshortened tubular shaft, the main shaft extending pilotably within the tubular shaft.

43. A nutating traction drive transmission comprising:
- a carrier rotatable about a central axis;
- first and second independently rotatable cone-like members individually having an axially outer end;
- a first spherically seated bearing assembly connected between the cone-like members;
- second and third spherically seated bearing assemblies supporting the respective outer ends of the cone-like members for rotation about an inclined axis intersecting the central axis; and
- shaft means for internally structurally supporting one of the cone-like members generally centrally between the second and third spherically seated bearing assemblies and thereby radially supporting the first spherically seated bearing assembly along the inclined axis.

44. The transmission of claim 43 wherein the shaft means includes a first shaft located generally within the first cone-like member and a second shaft located generally within the second cone-like member.

45. The transmission of claim 44 wherein the cone-like members individually have an axially inner end larger than the outer end, the axially inner ends being centrally internested with the first spherically seated bearing assembly being located thereat.

46. The transmission of claim 44 wherein the shaft means includes a sleeve bearing connected between the second cone-like member and the second shaft.

47. The transmission of claim 44 wherein the shaft means includes an extension shaft connected for joint rotation with the second cone-like member.

48. In a nutating traction drive transmission of the type including a driven carrier rotatable about a central axis, first and second cone-like members rotatably mounted within the carrier on an inclined axis, the improvement comprising:
- a first shaft operatively connected to the first cone-like member and having a first gear connected thereon along the inclined axis;
- a second shaft operatively connected to the second cone-like member and having a second gear thereon along the inclined axis; and
- first and second internal gear mechanisms individually having an output gear, the internal gear mechanisms independently connecting the first and second gears to the respective output gear.

49. The transmission of claim 48 wherein each of the internal gear mechanisms includes an internal ring gear rotatably mounted in the carrier and intermeshingly connecting the respective output gear to the respective first and second gear.

50. The transmission of claim 48 including a first separating mechanism located between the first cone-like member and the first shaft, a second separating mechanism located between the second cone-like member and the second shaft, and resilient means for continually urging the first and second cone-like members apart in cooperation with the first and second separating mechanisms.

51. The transmission of claim 50 wherein the first shaft is tubular and the second shaft extends within the first shaft.

52. The transmission of claim 50 wherein the first shaft is tubular, and including a third shaft connected to the second cone-like member and extending within the first shaft.

* * * * *